(12) United States Patent
Hieda et al.

(10) Patent No.: US 6,548,177 B2
(45) Date of Patent: Apr. 15, 2003

(54) TRANSPARENT SHOCK-ABSORBING LAMINATE AND FLAT PANEL DISPLAY USING THE SAME

(75) Inventors: Yoshihiro Hieda, Osaka (JP); Kazuhiko Miyauchi, Osaka (JP); Toshitaka Nakamura, Osaka (JP); Yukiko Azumi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/808,104

(22) Filed: Mar. 15, 2001

(65) Prior Publication Data
US 2002/0025441 A1 Feb. 28, 2002

(30) Foreign Application Priority Data

Mar. 15, 2000 (JP) .................................. 2000-072223
May 1, 2000 (JP) .................................. 2000-132799

(51) Int. Cl.$^7$ ................... B32B 17/10; B32B 27/08; H01J 29/88
(52) U.S. Cl. ................... 428/441; 428/220; 428/343; 428/354; 428/430; 428/432; 428/440; 428/442; 428/480; 428/911

(58) Field of Search ................... 428/220, 343, 428/354, 355 AC, 430, 432, 440, 441, 442, 483, 911

(56) References Cited

U.S. PATENT DOCUMENTS 4,683,172 A * 7/1987 LeGrand et al. ............ 428/412

* cited by examiner

*Primary Examiner*—D. S. Nakarani
(74) *Attorney, Agent, or Firm*—Sughrue Mion, PLLC

(57) ABSTRACT

A transparent shock-absorbing laminate to be formed on a glass substrate for a display panel having a fracture strength such that it is fractured by a falling ball impact (drop height: 1.5 m; ball weight: 510 g) corresponding to 79,000 N, the transparent shock-absorbing laminate comprising a shatter-proof layer having a shearing modulus of $2 \times 10^8$ Pa or more, at least two fracture-proof layers having a shearing modulus ranging from $1 \times 10^4$ to $2 \times 10^8$ Pa, each having different modulus, and a transparent pressure-sensitive adhesive layer.

9 Claims, 4 Drawing Sheets

FIG. 2 (A)

| ANTIREFLECTIVE LAYER OR ANTI-GLARE LAYER | | |
|---|---|---|
| HARD COAT LAYER | | |
| TRANSPARENT SHATTERPROOF LAYER | | |
| ELECTROMAGNETIC SHIELDING LAYER + NIR SHIELDING LAYER | | |
| ELECTRODE | FRACTURE-PROOF LAYER 1 | ELECTRODE |
| | FRACTURE-PROOF LAYER 2 | |
| | PRESSURE-SENSITIVE ADHESIVE LAYER | |
| PDP GLASS SUBSTRATE | | |

FIG. 2 (B1)

| ELECTRODE | ANTIREFLECTIVE LAYER OR ANTI-GLARE LAYER | ELECTRODE |
|---|---|---|
| | HARD COAT LAYER | |
| ELECTROMAGNETIC SHIELDING LAYER + NIR SHIELDING LAYER | | |
| TRANSPARENT SHATTERPROOF LAYER | | |
| FRACTURE-PROOF LAYER 1 | | |
| FRACTURE-PROOF LAYER 2 | | |
| PRESSURE-SENSITIVE ADHESIVE LAYER | | |
| PDP GLASS SUBSTRATE | | |

FIG. 2 (B2)

| ELECTRODE | ANTIREFLECTIVE LAYER OR ANTI-GLARE LAYER | ELECTRODE |
|---|---|---|
| ELECTROMAGNETIC SHIELDING LAYER + NIR SHIELDING LAYER | | |
| HARD COAT LAYER | | |
| TRANSPARENT SHATTERPROOF LAYER | | |
| FRACTURE-PROOF LAYER 1 | | |
| FRACTURE-PROOF LAYER 2 | | |
| PRESSURE-SENSITIVE ADHESIVE LAYER | | |
| PDP GLASS SUBSTRATE | | |

FIG. 2 (C)

| ELECTRODE | ANTIREFLECTIVE LAYER OR ANTI-GLARE LAYER | ELECTRODE |
|---|---|---|
| | PRESSURE-SENSITIVE ADHESIVE LAYER | |
| ELECTROMAGNETIC SHIELDING LAYER + NIR SHIELDING LAYER | | |
| TRANSPARENT SHATTERPROOF LAYER | | |
| FRACTURE-PROOF LAYER 1 | | |
| FRACTURE-PROOF LAYER 2 | | |
| PRESSURE-SENSITIVE ADHESIVE LAYER | | |
| PDP GLASS SUBSTRATE | | |

WINDOW FRAME
(280 x 280mm)

Al FRAME PLATE FOR FIXING
350 x 350mm, t = 2mm

GLASS PLATE
(PD 200, 300 x 300, t = 2.8mm)

Al PLATE
(300 x 300, t = 2mm)

| ANTIREFLECTION 0.1μm + HC (5μm) | | |
|---|---|---|
| TRANSPARENT SHATTERPROOF LAYER PET 188μμ | | |
| ELECTROMAGNETIC SHIELDING LAYER OR NIR SHIELDING LAYER | | |
| ELECTRODE | FRACTURE-PROOF LAYER 1 | ELECTRODE |
|  | FRACTURE-PROOF LAYER 2 POVIC 400μm |  |
|  | PRESSURE-SENSITIVE ADHESIVE LAYER 25μm |  |
| PDP GLASS SUBSTRATE | | |

FIG. 7

| ELECTRODE | SiO$_2$ ($\lambda$/2n) | ELECTRODE |
|---|---|---|
| ELECTROMAGNETIC SHIELDING LAYER OR NIR SHIELDING LAYER | | |
| SiO$_2$ ($\lambda$/4n) | | |
| HARD COAT LAYER | | |
| TRANSPARENT SHATTERPROOF LAYER PET 175μm | | |
| FRACTURE-PROOF LAYER 1   PRESSURE-SENSITIVE ADHESIVE, 25μm | | |
| FRACTURE-PROOF LAYER 2   POVIC 400μm | | |
| PRESSURE-SENSITIVE ADHESIVE LAYER 25μm | | |
| PDP GLASS PLATE | | |

FIG. 8

| ELECTRODE | ANTIREFLECTION + HC FILM PET 100μm | ELECTRODE |
|---|---|---|
| PRESSURE-SENSITIVE ADHESIVE LAYER 25μm | | |
| ELECTROMAGNETIC SHIELDING LAYER OR NIR SHIELDING LAYER | | |
| SiO$_2$ ($\lambda$/4n) | | |
| TRANSPARENT SHATTERPROOF LAYER PET 175μm | | |
| FRACTURE-PROOF LAYER 1   PRESSURE-SENSITIVE ADHESIVE, 25μm | | |
| FRACTURE-PROOF LAYER 2   POVIC 400μm | | |
| PRESSURE-SENSITIVE ADHESIVE LAYER 25μm | | |
| PDP GLASS PLATE | | |

FIG. 9

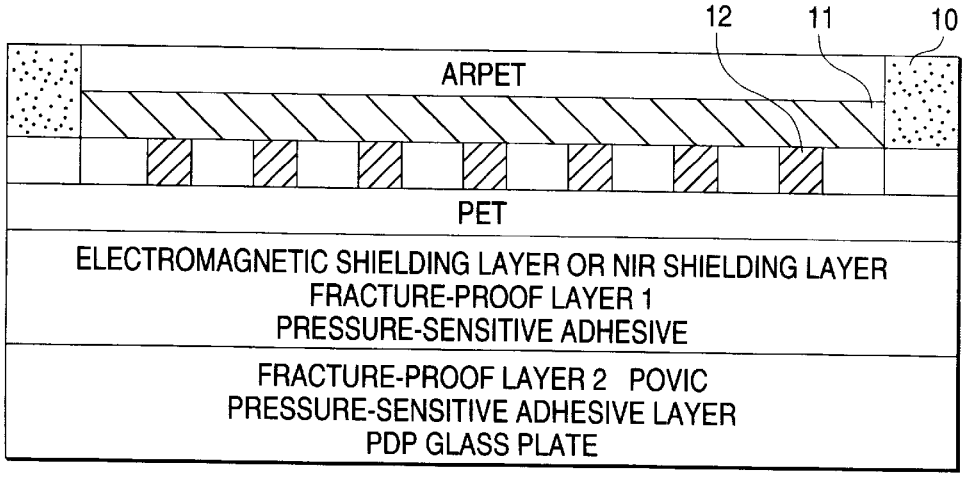

TRANSPARENT SHOCK-ABSORBING LAMINATE AND FLAT PANEL DISPLAY USING THE SAME

FIELD OF THE INVENTION

This invention relates to a transparent shock-absorbing laminate and a flat panel display using the same. More particularly, it relates to a shatterproof and fracture-proof shock-absorbing laminate which is to be formed on a glass substrate of a flat panel display, especially a glass substrate of a plasma display panel.

BACKGROUND OF THE INVENTION

Glass cathode-ray tubes (CRT) for TV sets and other displays are required to be shatterproof and not to allow a falling steel ball to pierce and make a hole of finger size or greater (which may give an electric shock) in a falling ball test as regulated by safety standards (e.g., UL Standards and Electrical Appliance and Material Control Law, Japan) To meet these standards the CRT glass panel should have some thickness.

In order to achieve weight reduction while securing shatterproofness, CRT glass panels laminated with a self-repairing synthetic resin protective film (preferably a thermosetting urethane resin film) have been proposed in JP-A-6-333515 and JP-A-6-333517. These glass panels are characterized by their shatterproofness but are not protected against breakage.

Flat panel displays (hereinafter FPDs) include field emission displays (FEDs), plasma addressed liquid crystal (PALC) displays, liquid crystal displays (LCDs), and plasma display panels (PDPs). PDPs have been attracting attention for their widescreen, but the glass substrate used in PDPs are particularly thin and fragile.

JP-A-11-174206 discloses a transparent resin sheet as a protective filter for protecting the inner glass substrate of FPDs such as LCDs or PDPs. The protective filter is set within 10 mm apart from the front surface of the display. Because of the space between the glass panel and the protective filter, there are left many problems, such as double reflection of external light, an increase of reflectance, and reduction in image sharpness due to parallax. Further, dust or stain (e.g., nicotine) will be accumulated in the space which is difficult to clean.

PDPs, which have ever been required to have a wider display area and a smaller weight, have shown a tendency to have a reduced thickness. It produces a contrary effect to put a protective filter in front of the panel. There has not been developed a thin and light protective filter against breakage for a PDP of large size.

PDPs comprise an array of cells containing a rare gas, particularly a neon-based gas, in which a discharge is generated to produce vacuum ultraviolet rays, by which phosphors (R, G and B) provided in the cells are excited to emit fluorescence. In this emission process, electromagnetic waves and near infrared rays which are unnecessary for the mechanism of a PDP are also emitted. Electromagnetic wave emission, in particular, is regulated by FCC regulations, VCCI (Voluntary Council for Interference by Information Technology Equipment, Japan) guidelines, etc. In recent years, harm of electromagnetic waves to human bodies is of concern. It is therefore necessary to shield the electromagnetic waves emitted from PDPs.

The near infrared (NIR) rays emitted from PDPs have wavelengths of about 800 to 1200 nm. The IR radiation can interfere with remote controls of electric appliances, karaoke equipment, audio and visual equipment, etc. which typically operate in a wavelength region of from about 700 to 1300 nm. Therefore, it is also necessary to cut the NIR rays emitted from PDPs.

Under these circumstances, a filter for cutting electromagnetic waves and IR rays emitted from PDPs has been demanded. Filters that have been heretofore proposed include a filter having a metal mesh embedded therein, an acrylic resin plate having an etched mesh pattern, an acrylic resin plate containing an NIR-absorbing dye, and a transparent multilayer laminate having a thin metal film sandwiched in between transparent thin films.

Application of these filters to PDPs has been studied. A filter used for such a display as a PDP usually comprises a glass substrate or an acrylic resin substrate which is not placed in contact with a PDP via a transparent adhesive layer but is within 10 mm apart from the front surface of a PDP. If it is adhered directly to a PDP, there is a fear that the glass substrate of a PDP may be fractured.

SUMMARY OF THE INVENTION

One object of the present invention is to provide a transparent shock-absorbing laminate having shatterproofness and fracture-proofness, which is adhered directly to a PDP glass substrate via a transparent pressure-sensitive adhesive, and a display comprising the structure.

Another object of the present invention is to provide a transparent shock-absorbing laminate having electromagnetic and/or NIR shielding properties as well as shatterproofness and fracture-proofness, which is adhered directly to a PDP glass substrate via a pressure-sensitive adhesive, a display comprising the structure.

The objects of the present invention are accomplished by:

a transparent shock-absorbing laminate to be formed on a glass substrate for a display panel having a fracture strength such that it is fractured by a falling ball impact (drop height: 1.5 m; ball weight: 510 g) corresponding to 79,000 N, said transparent shock-absorbing laminate comprising a shatterproof layer having a shearing modulus of $2 \times 10^8$ Pa or more, at least two fracture-proof layers having a shearing modulus ranging from $1 \times 10^4$ to $2 \times 10^8$ Pa, each having different modulus, and a transparent pressure-sensitive adhesive layer; and a flat panel display, such as a PDP, which comprises the above-described transparent shock-absorbing laminate adhered on a glass panel substrate thereof.

In a highly preferred embodiment of the invention, the shock-absorbing laminate further comprises a transparent electromagnetic shielding layer and/or an NIR shielding layer having a transmission of 20% or less in a wavelength region or from 800 to 1200 nm.

The shock-absorbing laminate preferably has a thickness of 2 mm or smaller and a visible light transmission of 40% or higher, whether or not it has the electromagnetic shielding layer and/or the NIR shielding layer.

The transparent shock-absorbing laminate preferably absorbs 50% or more of a falling ball impact which corresponds to an impact force of 79,000 N.

In another highly preferred embodiment, the transparent shock-absorbing laminate has a layer order of shatterproof layer (1)/fracture-proof layer (2)/fracture-proof layer (3)/. . . . fracture-proof layer (n)/pressure-sensitive adhesive layer (n+1), and the shearing moduli of the fracture-proof layers (2) to (n) are such that the absolute logarithmic values of shearing modulus (G) ratios of upper to lower layers adjacent to each other via every interface among the layers (1) to (n+1) (hereinafter referred to as G ratios) are added up to give the greatest sum, the sum of G ratios being represented by:

$$|\text{Log } G1/G2|+|\text{Log } G2/G3|+ \ldots +|\text{Log } Gn-1/Gn|+|\text{Log } Gn/Gn+1|.$$

In still another preferred embodiment, the shock-absorbing laminate basically comprises the pressure-sensitive adhesive layer, the fracture-proof layer, the shatterproof layer and an antireflective layer in this order, and further comprises an electromagnetic shielding layer and/or an NTR shielding layer.

Because the shock-absorbing laminate is directly bonded to a glass substrate or a PDP, etc., inconveniences due to an air gap (reduction in image sharpness, double reflection of external light, accumulation of dirt, staining with nicotine) can be eliminated. The transparent shock-absorbing laminate of the invention which has an electromagnetic shielding layer and/or an NIR shielding layer exhibits excellent shielding performance in addition to the above characteristics.

BRIEF DESCRIPTION OF THE DRAWINGS

FIG. 2 shows layer structures of the shock-absorbing laminate according to the invention which have an electromagnetic shielding layer and an NIR shielding layer, formed on a glass substrate.

FIG. 5 depicts a fracture test method.

FIGS. 6 to 9 each show the layer structure of the shock-absorbing laminate prepared in Examples 7, 8, 9, and 13, respectively, formed on a glass substrate.

DETAILED DESCRIPTION OF THE INVENTION

Figure 1:
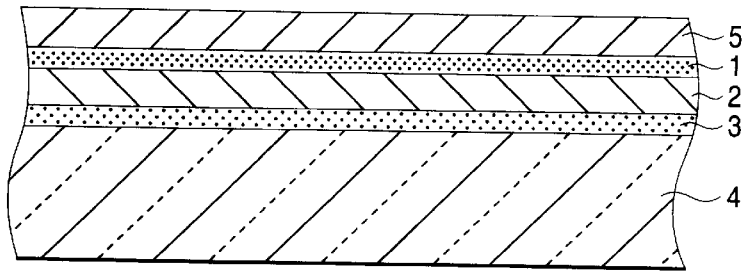
FIG. 1 shows a schematic cross-section of an example of the shock-absorbing laminate according to the invention formed on a glass substrate.

Making reference to safety standards, the inventors gave a steel ball weighing about 510 g a free fall from a height of 1.5 m to find the impact force to be 79,000 N by means of a force sensor. Further, they conducted a falling ball test of a glass substrate for FPDs to measure a critical impact force with which the glass substrate is fractured or an impact force with which the glass substrate is not fractured. Then they obtained the degree to which the critical impact force given to the glass substrate should be reduced by the shock-absorbing laminate of the present invention. The percentage of the reduced impact force to the critical impact force will hereinafter be referred to as a shock absorption ratio. The smaller the shock absorption ratio, the greater the shock absorbing performance. The method of obtaining a shock absorption ratio will be described later in detail.

The shock-absorbing laminate which can be used in the invention has basically at least two layers having different shearing moduli, i.e., a shatterproof layer, at least two fracture-proof layers, and a transparent pressure-sensitive adhesive layer, with which the laminate is adhered to a glass substrate. Where the laminate has three or more layers different in shearing modulus in the order of shatterproof layer (1)/fracture-proof layer (2)/fracture-proof layer (3)/ ... fracture-proof layer (n)/pressure-sensitive adhesive layer (n+1), the G ratios of the upper to lower fracture-proof layers adjoining each other via each interface can have a varied sum depending on their shearing moduli. In this connection, it is preferred that the shearing moduli of the layers (2) to (n) satisfy the relationship that their G ratios give a larger sum, especially the largest sum. When an impact force by a fallen ball is absorbed by a multilayer structure, the shear stress increases as the logarithm of the shearing modulus ratio of the upper to lower layers via each interface increases, whereby the impact force is greatly absorbed.

Where the shatterproof layer having a shearing modulus (G) of $2 \times 10^8$ Pa or greater is provided farther from the glass substrate than the fracture-proof layer, the shock-absorbing laminate itself can be prevented from being broken, and the glass substrate can be made shatterproof. The fracture-proof layer has a shearing modulus (C) of $1 \times 10^4$ to $2 \times 10^8$ Pa thereby making the glass substrate resistant to fracture.

It has been ascertained that the glass substrate can be sufficiently protected against fracture and shattering when the shock-absorbing laminate is capable of absorbing 50% or more of the impact force corresponding to 79,000 N which is the impact force of a steel ball weighing 510 g dropped from a height of 1.5 m, i.e., achieving a shock absorption ratio of 50% or less.

The shock-absorbing laminate of the invention can be made capable of shielding electromagnetic waves or NIR rays by providing an electromagnetic shielding layer and/or an NIR shielding layer on the shatterproof layer or the fracture-proof layer. The electromagnetic and/or NIR shielding layers include (1) a combination of an electrically conductive metal mesh (or a metal mesh pattern) and a layer containing an NIR absorbing dye, (2) a transparent multi-layer laminate alternately comprising a plurality of transparent thin films and a plurality of thin metal films, i.e., silver-containing conductive films and high-refractive films, (3) a combination of (1) and (2), and (4) a combination of a metal mesh (or a metal mesh pattern) and a transparent multilayer laminate which is composed of a transparent thin film and a thin metal film and reflects NIR rays. These electromagnetic and/or NIR shielding structures combined with the shock-absorbing structure of the invention secure a visible light transmission of 40% or more, a visible light reflectance of 5% or less, and an NIR transmission of 20% or less in a wavelength region of 800 to 1200 nm.

Specific layer structures of the shock-absorbing laminate of the present invention will be illustrated with reference to the accompanying drawings. FIG. 1 shows a schematic cross-section of an example of the shock-absorbing laminate according to the invention formed on a glass substrate, which has a glass substrate 4 for an FPD, a pressure-sensitive adhesive layer 3, a fracture-proof layer 2, a fracture-proof layer 1, and a shatterproof layer 5 in this order.

The structure shown in FIG. 1 embraces modifications as shown in FIG. 2. The structures shown in FIGS. 2 basically comprise an antireflective (AR) layer or an anti-glare (AG) layer, a shatterproof layer, a fracture-proof layer 1, a fracture-proof layer 2, a pressure-sensitive adhesive layer, and a PDP glass substrate in this order. In addition, they have an electromagnetic shielding layer and/or an NIR shielding layer disposed in an arbitrary position.

The electromagnetic shielding layer reduces an electromagnetic intensely by 10 dB or more, preferably 20 dB or more. When a 42-in PDP, for instance, emits an electromagnetic field having an intensity of 40 to 50 dB$\mu$V/m, an electromagnetic shielding material should have a shielding effect of 10 dB or more, preferably 20 dB or more. According to VCCI standards, for example, the electromagnetic field intensity emitted from class A equipment must be 40 dB$\mu$V/m or lower as measured at a frequency of 30 to 230 MHz and at a distance of 10 m. It is understood that the electromagnetic shielding layer should have a shielding effect of 10 dB or more, and preferably 20 dB or more to leave a margin of 6 to 7 dB. In order to achieve the shielding effect of 10 dB or more, the surface resistivity of the shielding layer should be 10$\Omega$ or less, preferably 3$\Omega$ or less.

It is preferred for the NIR shielding layer to reduce an NIR (800 to 1200 nm) transmission to 20% or less, particularly 10% or less, so as to prevent interference with operation of electrical appliances and optical communications.

Materials for making the electromagnetic and/or NIR shielding layers are not particularly limited as long as the above-mentioned functions are performed.

As briefly noted above, the electromagnetic and/or NIR shielding layer includes a combination of an electrically conductive metal mesh (or a metal mesh pattern) for electromagnetic shielding and, for NIR shielding, a layer containing a plurality of NIR-absorbing colorants (e.g., dyes or pigments), a layer comprising a thermoplastic, thermosetting, UV-curing or electron radiation-curing resin having dispersed therein electrically conductive and IR-reflecting particles (e.g., ITO or ATO) and NIR-absorbing colorants (e.g., dyes or pigments), or a transparent multilayer laminate which is composed of a transparent thin film and a thin metal film and reflects NIR.

Another type of the electromagnetic and/or NIR shielding layer is a transparent multilayer laminate having two to five unit laminates each composed of a transparent thin film and a transparent metal film (specifically a silver-containing electrically conductive film). More specifically, the multilayer laminate is composed of at least two unit laminates each having a structure of metal film/transparent thin film, a structure of transparent thin film/metal film/transparent thin film, or a structure of a metal film/transparent thin film/metal film. A laminate structure made up of a single metal film and two transparent thin films would have a poor electromagnetic shielding effect and fail to reduce the transmission to 20% or less in a broad NIR range. If the thickness of the metal film is increased to raise the electromagnetic shielding effect, the visible light reflectance will be increased to reduce the visible light transmission, and the NIR shielding effect would be insufficient.

The transparent thin film of the above-described transparent multilayer laminate can be of optically transparent materials, which may be either single substances or sintered composite materials. The refractive index of the film is selected so as to achieve desired optical characteristics according to an optical design. The plurality of the transparent thin films may be the same or different in material and/or refractive index. Materials which prevent migration of the thin metal film or have an oxygen barrier effect are preferred. Suitable materials include indium oxide, tin oxide, titanium dioxide, cerium oxide, zirconium oxide, zinc oxide, tantalum oxide, niobium pentoxide, silicon dioxide, silicon nitride, aluminum oxide, magnesium fluoride, magnesium oxide, and a combination of two or more thereof. A thin film comprising indium oxide as a main component and titanium dioxide, tin oxide or cerium oxide as a minor component is particularly preferred; for it is effective in preventing the thin metal film from deterioration and has electrical conductivity, which facilitates electrical connection to the thin metal film. The transparent thin films are formed by dry processes (vacuum thin film processing) such as sputtering, vacuum evaporation, and ion plating, or wet processes. Sputtering is preferred from the standpoint of film thickness control and uniformity. The transparent thin films each preferably have a thickness of 10 to 100 nm.

The thin metal films can be of silver or a silver-based alloy comprising 80% by weight or more of silver and 20% by weight or less of one or more alloying elements selected from gold, copper, palladium, platinum, manganese and cadmium. A solid solution comprising 80 to 99% by weight of silver and 1 to 20% by weight of the alloying element(s) is preferred. A solid solution containing 1 to 20% by weight of gold is particularly preferred for preventing silver from deterioration. A gold content exceeding 20% causes coloration to impair the transparency. A silver alloy containing less than 1% of gold is liable to suffer deterioration of silver. The transparent silver-containing conductive films are formed by vacuum dry processes such as sputtering. The transparent silver-containing conductive films each preferably have a thickness of 1 to 30 nm, particularly 5 to 20 nm.

The above-described transparent multilayer laminate composed of transparent thin films and silver-containing metal films is capable of reducing electromagnetic emission by 10 dB or more and of shielding NIR, particularly reducing the NIR transmission to 20% or less in a wavelength region of 800 to 1200 nm. The transparent multilayer laminate has a visible light transmission of 40% or more and an NIR transmission of 20% or less, preferably 10% or less.

Where the transparent multilayer laminate is provided on the shatterproof layer or the fracture-proof layer, adhesion can be improved by forming a metal film to a thickness that does not impair transparency (i.e., 10 nm or smaller) or by subjecting the surface of the shatterproof layer or the fracture-proof layer to a corona discharge treatment, a plasma treatment or any other known technique for adhesion improvement.

In order to prevent an increase of reflectance of the FPD filter, a low-refractive layer having a refractive index of 1.50 or smaller can be provided on the shatterproof layer or the fracture-proof layer on which the transparent multilayer laminate is to be formed. Such a low-refractive layer is formed with an optical thickness of $\lambda/4n\pm15\%$.

Where the FPD filter of the invention is required to have an electromagnetic shielding effect, an electrode is provided on the four sides of the transparent multilayer laminate or the metal mesh (or metal mesh pattern) as an electromagnetic shielding layer to electrically connect the layer to the FPD housing or for grounding. Materials of the electrode are not particularly limited as long as anticorrosion, resistance to moisture and heat, and adhesion to the electromagnetic shielding layer are secured. Suitable electrode materials include silver paste, an alloy comprising one or more of gold, silver, copper, platinum, palladium, etc., a composite of an organic coating material and the above-described alloy, and a double-sided conductive tape prepared by coating or impregnating a copper mesh with a pressure-sensitive adhesive. When the double-sided conductive tape is used, it is stuck directly to the four sides of the electromagnetic shielding layer to make an electrode. The other materials (i.e., silver paste, alloys or composites) are applied by wet processes, such as screen printing and microgravure coating, dry processes, such as vacuum evaporation and sputtering, plating, and the like.

The thickness of the electrode is not particularly limited. Where the electrode is provided under the shatterproof layer as in the structure shown in FIG. 2A, the thickness of the electrode is desirably equal to or slightly smaller than the total thickness of the fracture-proof layers and the transparent pressure-sensitive adhesive layer. In these structures, the fracture-proof layers and the pressure-sensitive adhesive layer should be formed on the area other than the electrode area. Where, on the other hand, the electrode is above the shatterproof layer as in the structures shown in FIGS. 2B1, 2B2 and C, the thickness of the electrode is desirably equal to or slightly smaller than the total thickness of the thickness of the AR or AG layer or the total thickness of the AR or AG layer and the pressure-sensitive adhesive layer. In these structures, the AR or AG layer should be formed on the area other than the electrode area.

Where the FPD filter of the invention is not required to have an electromagnetic shielding effect, there is no need to form an electrode, and the area for forming layers (i.e., the fracture-proof layers, the pressure-sensitive adhesive layer, and the AR or AG layer) is not restricted.

The shatterproof layer comprises a plastic film excellent in transparency (transmission: 70% or greater), mechanical strength, and heat resistance. Suitable plastic materials include polyester resins, such as polyethylene naphthalate (PEN) and polyethylene terephthalate (PET), (meth)acrylic resins, polycarbonate resins (PC), triacetyl cellulose (TAC), norbornene resins, epoxy resins, polyimide resins, polyetherimide resins, polyamide resins, polysulfone, polyphenylene sulfide, and polyether sulfone. The shatterproof layer can have a single layer structure or a multilayer structure.

It is required for the shatterproof layer to have a shearing modulus (G) of $2 \times 10^8$ Pa or higher in kinematic viscoelasticity measurement. This mechanical characteristic is essential for manifestation of shatterproofness against a fall of a steel ball (510 g×1.5 m) which corresponds to 79,000 N, i.e., for not allowing a steel ball to pierce through the shock-absorbing structure of the present invention. If the shearing modulus of the shatterproof layer is below this level, the shock-absorbing structure (i.e., the shock-absorbing laminate formed on the PDP glass substrate) will be disintegrated on impact by a free fall of a steel ball weighing 510 g from a height of 1.5 m (i.e., 79,900 N) to make a hole, letting the steel ball pierce through the hole. Making a hole produces a possibility of giving an electrical shock.

In the present invention, the shearing modulus (G) was measured at 25° C.±3° C. and at a frequency of 1 Hz with a kinematic viscoelasticity measuring instrument DMS120 supplied by Seiko Instruments Inc. In general, a tensile modulus (E) is about three times a shearing modulus (G).

The shatterproof layer, which is provided farther from the glass substrate than the fracture-proof layer, can be subjected to a known antireflective surface treatment to have its visible reflectance reduced to 5% or less, preferably 3% or less, or a known antiglare surface treatment for preventing external light reflection to have its haze reduced to 5% or less.

Because the surface of the shock-absorbing laminate preferably has a pencil hardness of H or higher, a known hard coat (HC) layer can be provided on one or both sides of the shatterproof layer for surface protection. Materials of the hard coat include UV-curing resins, electron radiation-curing resins, and thermosetting resins. The UV-curing resins include a mixture of a monomer or an oligomer providing polyester resins, polyacrylic resins, polyurethane resins, polyamide resins, silicone resins, epoxy resins, acryl/urethane resins, acryl/epoxy resins, etc. and a photopolymerization initiator. In general, a photopolymerization initiator is not needed for electron radiation-curing resins. The thermosetting resins include phenolic resins, urea resins, melamine resins, unsaturated polyester resins, polyurethane resins, epoxy resins, etc., to which additives, such as crosslinking agents, polymerization initiators, polymerization accelerators, solvents, viscosity modifiers, and the like, can be added if desired.

The HC layer can also be made of an organic/inorganic hybrid composite in which silicone and an acrylic resin are chemically bonded or a composite comprising the above-described resin and transparent inorganic particles, such as silicon oxide, zirconium oxide, ITO or tin oxide. The HC layer can contain additives such as leveling agents, antistatic agents, and UV absorbers. When the HC layer is directly provided on the shatterproof layer, it can contain additives having a carboxyl group, a phosphoric acid group, a hydroxyl group, an amino group, an isocyanate group, etc. to improve adhesion. A suitable thickness of the HC layer is 0.1 to 20 $\mu$m, particularly 1 to 10 $\mu$m.

If desired, the surface having been subjected to an antiglare or antireflective surface treatment can be subjected to a stain-proofing treatment against, for example, finger prints. The antireflective or antiglare surface treatment can also be effected by adhering a film having an antireflective function or an antiglare function to the shatterproof layer, etc. with a transparent pressure-sensitive adhesive.

The above-described low-refractive layer which is provided for antireflection can be formed either by a wet process such as microgravure coating or a dry process such as vacuum evaporation or sputtering. Any material, either organic or inorganic, can be used with no particular restriction as long as visible-light transmission, durability and adhesion are obtained. The low-refractive layer has a refractive index of 1.50 or smaller, preferably 1.45 or smaller. Organic materials for the low-refractive layer include, but are not limited to, fluororesins comprising fluoroethylene, vinylidene fluoride, tetrafluoroethylene, etc., partially or totally fluorinated alkyl esters of (meth)acrylic acid, and fluorine-containing silicone. Inorganic materials for the low-refractive layer include, but are not limited to, $MgF_2$, $CaF_2$ and $SiO_2$. The low-refractive layer preferably has a thickness of 1 $\mu$m or smaller, particularly 0.5 $\mu$m or smaller.

If desired, a stain-proof layer can be formed on the low-refractive layer. Materials of the stain-proof layer include organopolysiloxanes, perfluoroalkyl-containing polymers, perfluoroalkyl-containing alkoxysilane compounds, compounds having a perfluoroether group and a reactive silyl group, and mono- or disilane compounds containing a polyfluoroalkyl group. The stain-proof layer preferably has a thickness of 0.001 to 0.5 $\mu$m, particularly 0.002 to 0.1 $\mu$m.

A high-refractive layer constituting the antireflective layer or a high-refractive antiglare layer can be formed by a wet process such as microgravure coating or a dry process such as vacuum evaporation or sputtering. Any material, either organic or inorganic, can be used with no particular restriction as long as visible light transmission, durability and adhesion are obtained. The high-refractive layer has a refractive index of 1.5 or greater, preferably 1.60 or greater.

Organic materials for the high-refractive layer include, but are not limited to, polyfunctional polymerizable compounds having two or more functional groups (e.g., an acryloyl group or a methacryoyl group), such as urethane (meth)acrylate, polyester (meth)acrylate or polyether (meth)acrylate, which cure on application of active energy rays, such as UV or electron radiation; and crosslinking resins, such as silicone resins, melamine resins and epoxy resins, which cure by thermal crosslinking. Inorganic materials for the high-refractive layer include a mixture comprising indium oxide as a main component and titanium dioxide, tin oxide or cerium oxide as a minor component, $CeF_3$, $Al_2O_3$, MgO, $TiO_2$, and ZnO. Composites comprising an organic compound matrix having inorganic particles dispersed therein are also useful. The above-enumerated organic materials can be used as the matrix. The inorganic particles to be dispersed preferably include oxides of metals, such as aluminum, titanium, zirconium and antimony. The high-refractive layer preferably has a thickness of 50 µm or smaller, particularly 10 µm or smaller.

Since the shatterproof layer is formed farther from the FPD glass substrate than the fracture-proof layer, i.e., nearer to a viewer, and gives influences to the image characteristics and surface functions of an FPD, it will be subjected to various known surface treatments involving coating or vacuum thin film formation, such as surface hardness treatment, antireflective treatment, antiglare treatment, electromagnetic shielding treatment, antistatic treatment, and stain-proofing treatment. It is therefore preferred for the shatterproof layer to have a heat resistance of 80° C. or higher.

Where the electromagnetic and/or NIR shielding layer is formed on the shatterproof layer, the HC layer can be provided on the shielding layer as shown in FIG. 2B1 or between the shatterproof layer and the shielding layer as shown in FIG. 2B2. Where the AR or AG layer as a top layer is formed directly on the shielding layer, a material having a phosphoric acid group can be incorporated into the AR or AG material to improve adhesion to the shielding layer.

It is preferred that the fracture-proof layer be excellent in transparency as having a transmission of 60% or more and have a shearing modulus (G) ranging from $1 \times 10^4$ to $2 \times 10^8$ Pa. Sheeting whose shearing modulus is lower than $1 \times 10^4$ Pa is so soft that it is difficult to blank or cut to size and is easily squeezed out. If the shearing modulus exceeds $2 \times 10^8$ Pa, the layer is no longer capable of absorbing the impact force of 79,000 N, causing the glass substrate to be fractured, unless the fracture-proof layer has such a thickness of 2 mm or greater that will deteriorate image quality.

Materials which can be used to form the fracture-proof layer are not particularly limited provided that the transparency and shearing modulus requirements are fulfilled. Suitable materials include thermoplastic resins, such as ionomers mainly comprising ethylene-methacrylic acid copolymer molecules which are crosslinked via metallic ions (e.g., $Na^+$ or $Zn^{2+}$), ethylene-vinyl acetate copolymers (EVA), polyvinyl chloride (PVC), ethylene-acrylate copolymers (EEA), polyethylene (PE), polypropylene (PP), polyamide resins, polybutyral resins, and polystyrene resins; thermoplastic elastomers, such as polystyrene elastomers, polyolefin elastomers, polydiene elastomers, PVC elastomers, polyurethane elastomers, polyester elastomers, polyamide elastomers, fluorine-containing elastomers, chlorinated polyethylene elastomers, styrene-olefin copolymer elastomers, (hydrogenated) polystyrene-butadiene copolymer elastomers, and styrene-vinyl-isoprene copolymer elastomers; and polyblends comprising a polyolefin (e.g., PE or PP) and the thermoplastic elastomer.

A laminate having a structure of polyolefin (e.g., PP or PE)/thermoplastic resin (e.g., EVA)/polyolefin, a laminate having a structure of polyolefin (e.g., PP or PE)/polyolefin+ thermoplastic elastomer/polyolefin (e.g., PP or PE), a laminate of a plurality of layers made up of mixtures of polyolefin and a thermoplastic elastomer in different mixing ratios, or a laminate of PP/PE/PP can also serve as a fracture-proof layer. Additionally, a composite having a thermoplastic elastomer as a core and an acrylic resin as a shell is also useful as a fracture-proof layer.

A transparent pressure-sensitive adhesive layer can also function as a fracture-proof layer. For example, acrylic adhesives, rubber adhesives, and polyester adhesives, preferably highly transparent acrylic pressure-sensitive adhesives provide a fracture-proof layer. The acrylic pressure-sensitive adhesive is prepared by polymerizing one or more of alkyl (meth)acrylate compounds which will provide polymers having a glass transition temperature (Tg) of 60° C. or lower as a main monomer(s) that will provide moderate wettability and softness and, if necessary, a functional group-containing monomer and other copolymerizable monomers and adding various additives commonly employed in the art to the resulting acrylic copolymer. The polymerization is carried out in the presence of an appropriate catalyst by solution polymerization, emulsion polymerization, bulk polymerization (especially UV radiation-induced polymerization), suspension polymerization, and the like. Adhesives of heat crosslinking type or radiation (UV or electron beam) crosslinking type are also useful.

In addition to the above-described pressure-sensitive adhesives, adhesive components which can provide a fracture-proof layer include naturally-occurring polymers, such as glue and starch; semisynthetic polymers, such as acetyl cellulose; and synthetic polymers, such as polyvinyl acetate, PVC, epoxy resins, urethane resins, polychloroprene, acrylonitrile-butadiene rubber (NBR), melamine resins, acrylic resins, EVA, polyester resins, and polyamide resins. These adhesive components can be formulated into various types, such as a room temperature curing type, a heat curing type, and a UV-, electron radiation- or laser-induced curing type.

A fracture-proof layer can be formed on the shatterproof layer either by lamination under heat or by coating with a resin solution. Similarly, a plurality of fracture-proof layers can be formed by heat lamination or coating. If necessary, adhesiveness among these layers can be improved by incorporating various tackifiers or conducting a surface treatment (e.g., a corona discharge treatment, a plasma treatment) on the fracture-proof layer or the shatterproof layer. Where a fracture-proof layer to be formed on a shatterproof layer or another fracture-proof layer is made of the pressure-sensitive adhesive or the adhesive component, it can be formed either by coating the shatterproof layer or the another fracture-proof layer with a adhesive composition or by transferring an adhesive layer previously formed on a release sheet onto the shatterproof layer or the another fracture-proof layer.

The transparent pressure-sensitive adhesive layer which is the undermost layer of the shock-absorbing laminate, with which the shock-absorbing laminate is adhered to an FPD glass substrate, includes acrylic adhesives, rubber adhesives, rubber adhesives, and polyester adhesives, with acrylic pressure-sensitive adhesives which have high transparency being preferred. The same acrylic pressure-sensitive adhesives as described above with respect to the pressure-sensitive adhesive layer that can function as a fracture-proof layer can be used here.

Since this pressure-sensitive adhesive layer is directly stuck onto an FPD glass substrate, it must have both adhesive strength and reworkability. From these standpoints, it is preferred for the transparent pressure-sensitive adhesive layer to have a shearing modulus of $1 \times 10^4$ to $1 \times 10^7$ Pa and a thickness of 10 to 500 μm. Too thin, the layer tends to fail to exhibit satisfactory adhesion. Too thick, the adhesive may be squeezed out.

The shatterproof layer preferably has a thickness of 10 to 600 μm for fracture prevention. If it is thinner than 10 μm, the glass substrate is liable to be broken and shatter under an impact force of 79,000 N. If it is thicker than 600 μm, the thicknesses of the fracture-proof layer and the pressure-sensitive adhesive layer must be reduced relatively, resulting in a failure to secure fracture-proofness.

The fracture-proof layers preferably have a total thickness of 20 to 1700 μm, preferably 20 to 1000 μm. Fracture-proof layers thinner than 20 μm have reduced fracture-proofness, and fracture-proof layers thicker than 1700 μm are costly and have reduced transparency.

The total thickness of the shock-absorbing laminate comprising a shatterproof layer, at least two fracture-proof layers, a transparent pressure-sensitive adhesive layer and, if desired, an electromagnetic shielding layer and/or an NIR shielding layer is desirably 2 mm or smaller, more desirably 1 mm or smaller, from the viewpoint of FPD image quality. Further, the FPD filter should have a light transmission of 40% or more, preferably 50% or more, for securing an image contrast and preventing image quality deterioration.

Where the FPD filter is required to have a function of image color adjustment, known dyes or pigments having specific visible light absorption can be incorporated into the shock-absorbing structure of the invention.

The method of measuring the actual impact force (F) produced in a falling ball test and the method of obtaining a shock absorption ratio (R) are then described.

Figure 3:
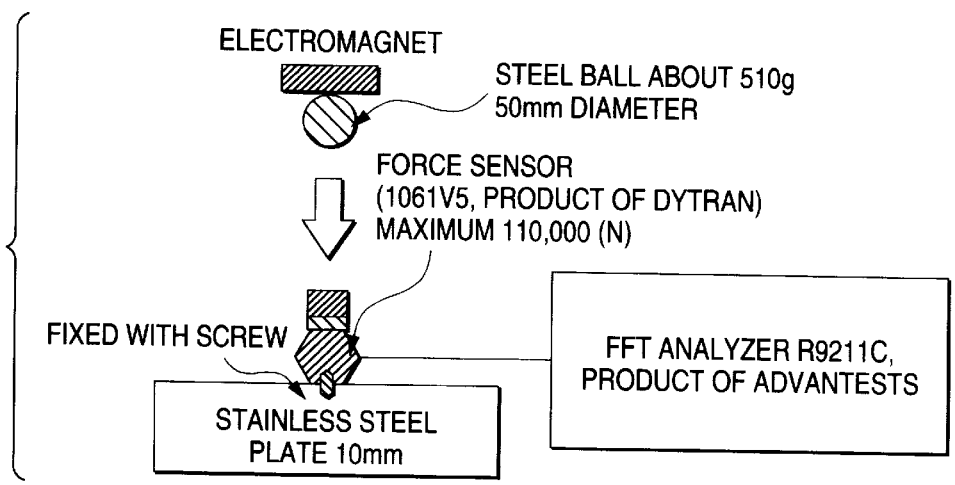
FIG. 3 illustrates a method of measuring an impact force by a free fall of a steel ball.
Figure 4:
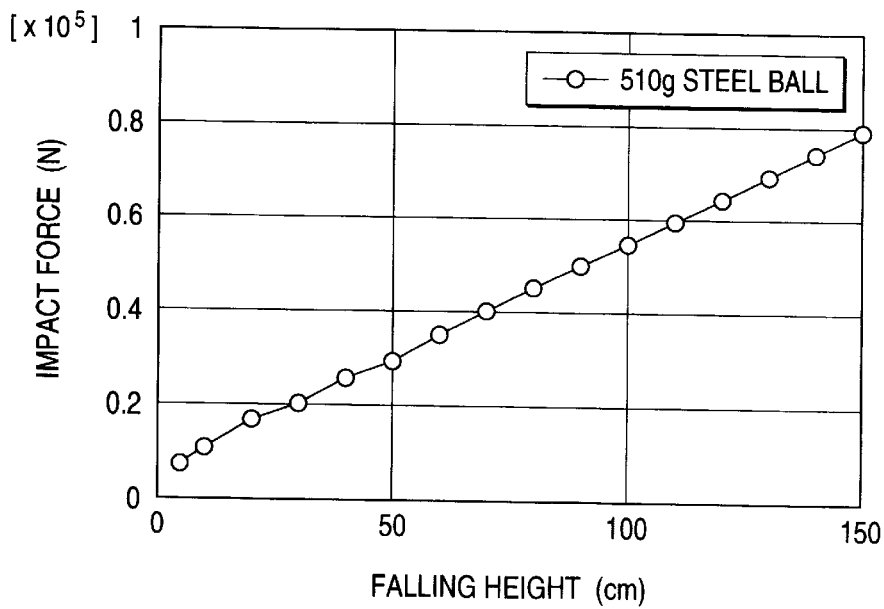
FIG. 4 is a graph of impact force vs. drop height in the measurement illustrated in FIG. 3.

The inventors measured an impact force F (N) imposed on a force sensor which is produced by a free fall of a steel ball weighing about 510 g and having a diameter of 50 mm from a varied drop height at room temperature (23±3° C.) as shown in FIG. 3. The measurement was made with a force sensor 1061V5, available from Dytran Instruments Inc. (maximum measurable force: 110,000 N) which is connected to a Fast Fourier Transform (FTT) analyzer R9211C, supplied by Advantest Corp. The results of the measurement are shown in FIG. 4. As shown in FIG. 4, the impact force at a drop height of 1.5 m (F0) was about 79,000 N.

The same falling ball test (510 g×1.5 m) was carried out with a shock-absorbing laminate being stuck to the force sensor via its pressure-sensitive adhesive layer to measure the impact force F1 (N) imposed on the force sensor. The shock absorption ratio (R1) of the shock-absorbing laminate is obtained by equation:

Shock absorption ratio $R1$ (%)=[$F1/F0$ (=79,000 N)]×100

Figures 5, 6:
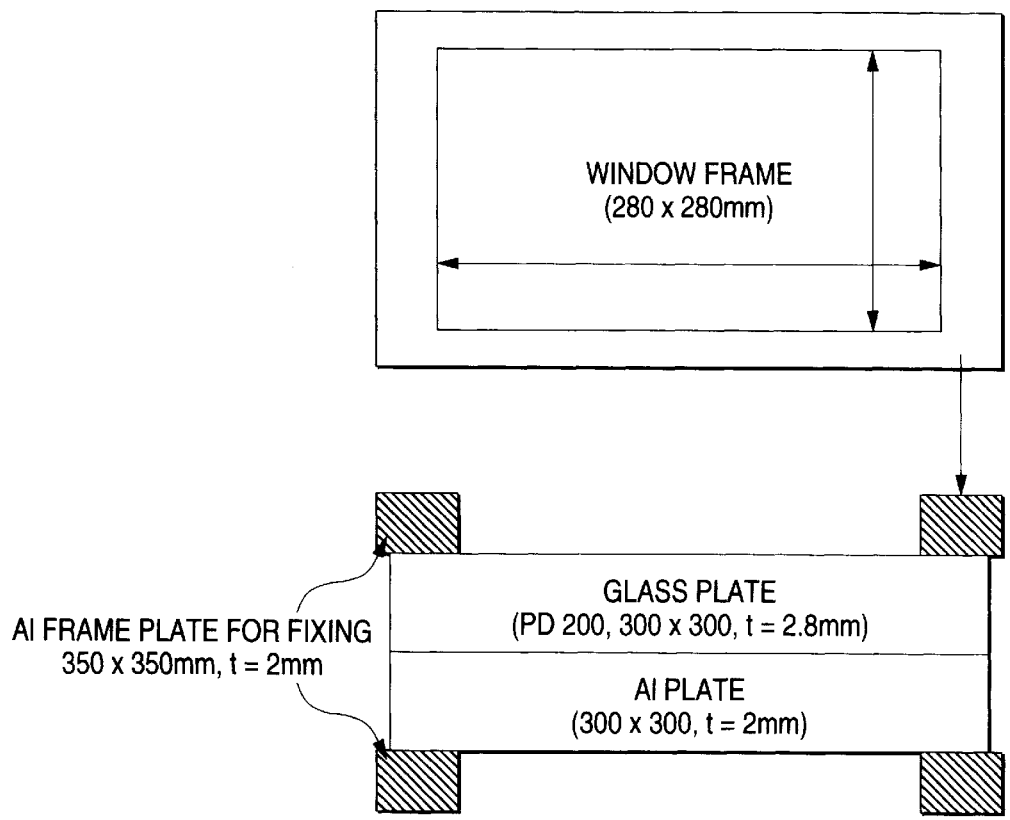

A fracture test was then carried out as shown in FIG. 5. High strain point glass PD200 (available from Asahi Glass Co., Ltd., elastic modulus: $7.6 \times 10^{10}$ Pa) was chosen as a glass substrate to be tested. PD200 is glass developed for use as a PDP substrate which is said to be particularly brittle to impact compared with other FPDs. One or two sheets of PD200 (300×300×2.8 (t) mm each) were put on an aluminum plate (300×300×2 (t) mm), and the glass and the aluminum plate were fixed between a pair of aluminum frames (external dimension: 350×350 mm; thickness: 2 mm each). A steel ball weighing about 510 g was dropped on the center of the glass substrate from a drop height of 1.5 m. The results are shown in Table 1 below.

TABLE 1

| | Drop Height at Fracture (cm) | Impact Force at Fracture F2 (N) | Shock-Absorption Ratio R0* (%) |
|---|---|---|---|
| Blank | 150 | 79000 (=F0) | — |
| One Glass Substrate | 60 | 36000 | 46 |
| Two Glass Substrates | 30 | 21000 | 27 |

*R0 = (F2/F0) × 100 (%)

With the falling ball weight being fixed at 510±20 g, a sheet of the glass is broken at a drop height of 60 cm or more, i.e., an impact force of about 36000 N or greater, and two sheets of the glass are broken at a drop height of 30 cm or more, i.e., an impact force of 21000 N or greater. In order to protect a PDP glass substrate against fracture on impact, it is understood that the shock-absorbing laminate to be bonded to the glass substrate via its pressure-sensitive adhesive layer must be capable of absorbing the falling ball impact (510 g×1.5 m=79,000 N) to reduce to less than 3600 N, preferably less than 21000 N. In other words, the glass substrate can be prevented from being fractured when the shock-absorbing laminate achieves a shock absorption ratio (R1) of about 50% (derived from 36000/79000×100=46%) or less, preferably 27% (derived from 21000/79000×100=27%) or less.

With respect to a falling ball test, safety standards, such as UL1418 (about 540 g×1.3 m), UL1930 (about 500 g×1.3 m), and Electrical Appliance and Material Control Law (Japan) (500 g×1.5 m), specify the number, size, and shattering distance of fragments to evaluate shatterproofness and also require for safety against an electrical shock that a hole of finger size should not be made (the ball should not pierce a test object). Apart from the safety problem, it is problematic for a flat display panel which is expensive to be broken.

In addition to the known standards for shatterproofness and safety against an electrical shock, guidelines for designing a shock-absorbing laminate that will protect a glass panel against fracture have now been made clear by determining the actual impact force of a steel ball weighing 510 g dropped from a height of 1.5 m with which a glass substrate is fractured and by constituting the shock-absorbing structure so as to prevent the glass substrate from being fractured.

It has now been revealed that a glass substrate would not be broken when the shock-absorbing laminate has such a shock absorbing ability as to reduce the impact force produced by a steel ball weighing about 510 g dropped from a height of 1.5 m (=79000 N) to 50% or less, preferably 27% or less.

Namely, a shock-absorbing laminate which protects glass substrate from being fractured should be designed to satisfy the following relationships.

(a) F2 (impact force (N) at fracture)>F1 (impact force (N) after absorption by shock-absorbing laminate)

(b) R0 (shock absorption ratio at fracture)>R1 (shock absorption ratio of shock-absorbing laminate) The impact force F1 (N) after absorption by the shock-absorbing laminate can be measured in the same manner as described above (see FIG. 3).

The shock absorption ratio R0 (the ratio of the impact force P2 (N) with which the glass is fractured in the fracture test of FIG. 5 to the impact force F0 (N) which is produced by the falling ball) and the shock absorption ratio R0 (the ratio of the impact force F1 (N) after absorption by the shock-absorbing laminate to the impact force F0 (N) are obtained as follows.

$$R0\ (\%) = (F2/F0) \times 100$$

$$R1\ (\%) = (F1/F0) \times 100$$

When R1 is smaller than R0, the glass substrate is prevented not being fractured.

The layer structure of the shock-absorbing laminate according to the present invention is then described. In order to secure shatterproofness against a falling ball, i.e., to prevent a fallen ball from making a hole, it is desirable that the shatterproof layer be provided farther from a FPD glass substrate, e.g., a PDP glass substrate than the fracture-proof layer. Where the fracture-proof layer is provided above the Layer A—thickness: 1.88 $\mu$m; shearing modulus: $1.4 \times 10^9$ Pa; This layer was used as a top layer (shatterproof layer)

Layer B—thickness: 25 $\mu$m; shearing modulus: $7.7 \times 10^4$ Pa

Layer C—thickness: 400 $\mu$m; shearing modulus: $6.9 \times 10^7$ Pa

Each shock-absorbing laminate was formed on the glass substrate PD200, and a shock absorption ratio R1 (%) [(impact force F1 (N) after absorption by the shock-absorbing laminate)/impact force F0 (N) produced by the falling ball (=79000 N)] was obtained in the same manner as described above. The results obtained are shown in Table 2.

TABLE 2

| Layer Order | Shearing Modulus (Pa) | | | | Sum of G Ratios[1] | Shock Absorption Ratio R1[2] | Shock Absorption Ratio R0[3] (%) | | State of Glass in Fracture Test | |
|---|---|---|---|---|---|---|---|---|---|---|
| | Shatter-proof Layer | Fracture-proof Layer | Fracture-proof Layer | Pressure-sensitive Adhesive Layer | | | One Sheet | Two Sheets | One Sheet | Two Sheets |
| a | A: $1.4 \times 10^9$ | B: $7.7 \times 10^4$ | C: $6.9 \times 10^7$ | B: $7.7 \times 10^4$ | 10.16 | 24.0 | 46.0 | 27.0 | Not fractured | Not fractured |
| b | A: $1.4 \times 10^9$ | B: $7.7 \times 10^4$ | B: $7.7 \times 10^4$ | C: $6.9 \times 10^7$ | 7.21 | 29.0 | 46.0 | 27.0 | Not fractured | Fractured |
| c | A: $1.4 \times 10^9$ | C: $6.9 \times 10^7$ | B: $7.7 \times 10^4$ | B: $7.7 \times 10^4$ | 4.26 | 37.0 | 46.0 | 27.0 | Not fractured | Fractured |

[1]|Log G1/G2| + ... + |Log Gn/Gn+1|
[2][(impact force F1 (N) after absorption by the shock-absorbing laminate)/(impact force F0 (N) with no shock-absorbing laminate (=79000 N))] × 100
[3][(impact force F2 (N) with which the glass is fractured (=36000 N or 21000 N)/(impact force F0 (N) produced by the falling ball (=79000 N)] × 100 shatterproof layer, it will be broken on impact. This does not mean that the shatterproof layer must always be provided above the fracture-proof layer because the shatterproof layer, wherever it may be, prevents the laminate as a whole from making a hole. The laminate can have a plurality of shatterproof layers, in which case at least one shatterproof layer is provided above the fracture-proof layer, and another shatterproof layer can be provided between the fracture-proof layer and the pressure-sensitive adhesive layer adjacent to the glass substrate: shatterproof layer/fracture-proof layer/shatterproof layer/pressure-sensitive adhesive layer.

Where the shock-absorbing laminate has a layer structure: shatterproof layer/two or more fracture-proof layers/pressure-sensitive adhesive layer, the shatterproof layer, fracture-proof layers and the pressure-sensitive adhesive layer are preferably build up in such an order as to give the greatest sum of G ratios.

In more detail, where the transparent shock-absorbing laminate has a structure: shatterproof layer (1)/fracture-proof layer (2)/fracture-proof layer (3)/ . . . fracture-proof layer (n)/pressure-sensitive adhesive layer (n+1), the shearing stress tends to be higher to exhibit higher shock absorbing performance against the impact force by a falling steel ball corresponding to 79000 N according as the sum of G ratios becomes greater. The sum of G ratios can be represented by:

$$|\log G1/G2| + |\log G2/G3| + \ldots + |\log Gn-1/Gn| + |\log Gn/Gn+1|.$$

To ascertain the above tendency, the following test was carried out. Transparent shock-absorbing laminates having a structure of shatterproof layer/two fracture-proof layers/pressure-sensitive adhesive layer were prepared by using the following three layers in the order shown in Table 2 below.

As shown in Table 2 above, the sum of G ratios is the greatest in the layer order (a: layer A/layer B/layer C/layer B) and smallest in the layer order (c: layer A/layer C/layer B/layer B). It is seen that the shock-absorbing laminate having the layer order (a) has the smallest shock absorption ratio R1 (24%). This indicates that the order of layers having the greatest sum of G ratios exhibits the highest shock absorbing ability to prevent the FPD glass substrate, either single or double, from being fractured.

It has thus been proved preferred that a plurality of fracture-proof layers be so arranged as to give a greater sum of G ratios, particularly a greatest sum of G ratios.

The present invention will now be illustrated in greater detail with reference to Examples, but it should be understood that the invention is not construed as being limited thereto.

1) Guideline for Designing Dhock-absorbing Laminate Preventing Glass Substrate from Being Fractured

F2>F1

R0>R1

2) Falling Ball Test

A shock-absorbing laminate was stuck on a sheet of high strain point glass (PD200, available from Asahi Glass Co., Ltd., 300×300×2.8 (t) mm) via its transparent pressure-sensitive adhesive layer, and the resulting assembly was framed as shown in FIG. 5. A falling ball test was carried out in the same manner as described above, and the shatterproofness and the state of the breakage of the glass were evaluated with the naked eye.

The impact force F1 (the force imposed on the glass substrate after absorption by the shock-absorbing laminate), the shock absorption ratios R0 (F2/F0) and R1 (F1/F0) were measured in the same manner as described above. When R1 is smaller than R0, the glass substrate is not fractured.

3) Measurement of Shearing Modulus

A shearing modulus (G) of a sample (5×10 mm) was measured with a kinematic viscoelasticity measuring instrument DMS120 supplied by Seiko Instruments Inc. at a temperature of 25° C.±3° C. and at a frequency of 1 Hz.

4) Visible Light Transmission and Reflectance

A transmission spectrum and a reflection spectrum (angle of incidence: 0°) of a shock-absorbing laminate, etc. were measured with a multichannel spectrophotometer MCPD-3000 supplied to Otsuka Electronics Co., Ltd. A visible light transmission and a visible light reflectance were calculated from the respective spectra in accordance with JIS R3016. An NIR shielding ratio in a wavelength region of 800 to 1200 nm was measured with a spectrophotometer U-3410 supplied by Hitachi, Ltd.

EXAMPLE 1

A polyethylene terephthalate (PET) film having a thickness of 175 µm and a shearing modulus (a) of $1.4 \times 10^9$ Pa (OX69K, available from Mitsubishi Chemical Corp.) was used as a shatterproof layer, a top layer. A butyl acrylate-acrylic acid copolymer having a weight average molecular weight of about 1,500,000 and a Tg of about −20° C. was applied on the PET film to form an acrylic pressure-sensitive adhesive layer having a thickness of 25 µm and a shearing modulus of $7.7 \times 10^4$ Pa, which functioned as a fracture-proof layer 1. A PP/EVA/PP laminate film having a thickness of 400 µm and a shearing modulus of $6.9 \times 10^7$ Pa (POVIC-T, available from Achilles Corp.) was stuck to the fracture-proof layer 1 to form a fracture-proof layer 2. The same acrylic pressure-sensitive adhesive as used above was applied to the fracture-proof layer 2 to a thickness of 25 µm to form a transparent shock-absorbing laminate having a thickness of 625 µm. This thickness caused no image distortion when the laminate was directly stuck to a flat display panel.

The resulting shock-absorbing laminate was stuck onto a sheet of high strain point glass PD200 (300×300×2.8 (t) mm) with its transparent pressure-sensitive adhesive layer to obtain a glass substrate with a transparent shock-absorbing laminate. The glass substrate with a shock-absorbing laminate had a transmission of 82%.

The resulting glass substrate with a shock-absorbing laminate was subjected to a falling ball test with a single sheet or two sheets of the glass substrate as shown in FIG. 5. The shock absorption ratio R1 of the shock-absorbing laminate was measured as shown in FIG. 3.

EXAMPLE 2

A glass substrate with a shock-absorbing laminate was prepared in the same manner as in Example 1, except for changing the thickness of the fracture-proof layer 2 (PP/EVA/PP laminate, POVIC-T) to 600 µm. The thickness of the shock-absorbing laminate (PET/pressure-sensitive adhesive layer/POVIC-T/adhesive layer) was 825 µm, and the glass substrate with a shock-absorbing laminate had a transmission of 80%.

EXAMPLE 3

A glass substrate with a shock-absorbing laminate was prepared in the same manner as in Example 1, except for replacing the fracture-proof layer 2 with a 500 µm thick polyurethane film (DUS605, non-yellowing type, available from Seadam Co.; shearing modulus: $4.6 \times 10^7$ Pa). The thickness of the shock-absorbing laminate (PET/pressure-sensitive adhesive layer/urethane/pressure-sensitive adhesive layer) was 625 µm, and the glass substrate with a shock-absorbing structure had a transmission of 78%.

EXAMPLE 4

A glass substrate with a shock-absorbing laminate was prepared in the same manner as in Example 1, except for replacing the PP/EVA/PP laminate with a 400 µm thick ClearTec H film (a film of PP blended with a styrene-vinyl-isoprene elastomer, supplied by Kuraray Trading Co.; shearing modulus: $3.1 \times 10^7$ Pa) as the fracture-proof layer 2. The thickness of the shock-absorbing laminate (PET/pressure-sensitive adhesive layer/CleaTec H/pressure-sensitive adhesive layer) was 625 µm, and the glass substrate with a shock-absorbing laminate had a transmission of 72%.

EXAMPLE 5

A glass substrate with shock-absorbing laminate was prepared in the same manner as in Example 1, except for replacing the PP/EVA/PP laminate with a 600 µm thick non-rigid PVC film (VINYLAS, available from Achilles Corp.; shearing modulus: $1.4 \times 10^7$ Pa) as the fracture-proof layer 2. The thickness of the shock-absorbing laminate (PET/pressure-sensitive adhesive layer/non-rigid PVC/pressure-sensitive adhesive layer) was 825 µm, and the substrate with a shock-absorbing laminate had a transmission of 81%.

EXAMPLE 6

A glass substrate with a shock-absorbing laminate was prepared in the same manner as in Example 2, except for reversing the order of the fracture-proof layers 1 and 2 to make a laminate structure of PET/POVIC-T/pressure-sensitive adhesive layer/pressure-sensitive adhesive layer.

Comparative Example 1

A glass substrate with a shock-absorbing laminate was prepared in the same manner as in Example 1, except for replacing the PP/EVA/PP laminate with a 400 µm thick PET film as a fracture-proof layer 2 to make a laminate structure of PET/pressure-sensitive adhesive layer/PET (400 µm)/pressure-sensitive adhesive layer.

Comparative Example 2

A glass substrate with a shock-absorbing laminate was prepared in the same manner as in Example 1, except that the fracture-proof layers 1 and 2 were omitted to make a laminate structure of PET/pressure-sensitive adhesive layer.

Comparative Example 3

A glass substrate with a shock-absorbing laminate was prepared in the same manner as in Example 3, except that the shatterproof layer (PET film) and the fracture-proof layer 1 were omitted to make a laminate structure of urethane/pressure-sensitive adhesive layer.

The results of measurement and evaluation made in the foregoing Examples and Comparative Examples are shown in Tables 3 and 4.

TABLE 3

| | R0 (%) | | Shearing Modulus (G) (Pa) | | | |
|---|---|---|---|---|---|---|
| | One Glass Sheet | Two Glass Sheets | Shatter-proof Layer | Fracture-proof Layer 1 | Fracture-proof Layer 2 | Pressure-sensitive Adhesive Layer |
| Example 1 | 46.0 | 27.0 | $1.4 \times 10^9$ | $7.7 \times 10^4$ | $6.9 \times 10^7$ | $7.7 \times 10^4$ |
| Example 2 | 46.0 | 27.0 | $1.4 \times 10^9$ | $7.7 \times 10^4$ | $6.9 \times 10^7$ | $7.7 \times 10^4$ |
| Example 3 | 46.0 | 27.0 | $1.4 \times 10^9$ | $7.7 \times 10^4$ | $4.6 \times 10^7$ | $7.7 \times 10^4$ |
| Example 4 | 46.0 | 27.0 | $1.4 \times 10^9$ | $7.7 \times 10^4$ | $3.1 \times 10^7$ | $7.7 \times 10^4$ |
| Example 5 | 46.0 | 27.0 | $1.4 \times 10^9$ | $7.7 \times 10^4$ | $1.4 \times 10^7$ | $7.7 \times 10^4$ |
| Example 6 | 46.0 | 27.0 | $1.4 \times 10^9$ | $6.9 \times 10^6$ | $7.7 \times 10^4$ | $7.7 \times 10^4$ |
| Comparative Example 1 | 46.0 | 27.0 | $1.4 \times 10^9$ | $7.7 \times 10^4$ | $1.4 \times 10^9$ | $7.7 \times 10^4$ |
| Comparative Example 2 | 46.0 | 27.0 | $1.4 \times 10^9$ | — | — | $7.7 \times 10^4$ |
| Comparative Example 3 | 46.0 | 27.0 | — | — | $4.6 \times 10^7$ | $7.7 \times 10^4$ |

TABLE 4

| | R1 (%) | Shatter-proofness* | State of Glass In Fracture Test** | | Sum of G Ratios |
|---|---|---|---|---|---|
| | | | One Sheet | Two Sheets | |
| Example 1 | 24.0 | Good | Good | Good | 10.16 |
| Example 2 | 17.0 | Good | Good | Good | 10.16 |
| Example 3 | 26.0 | Good | Good | Good | 9.81 |
| Example 4 | 21.0 | Good | Good | Good | 9.47 |
| Example 5 | 22.0 | Good | Good | Good | 8.78 |
| Example 6 | 37.0 | Good | Good | Bad | 4.26 |
| Comparative Example 1 | 53.0 | Good | Bad | Bad | — |
| Comparative Example 2 | 62.0 | Good | Bad | Bad | — |
| Comparative Example 3 | 68.0 | Bad | Bad | Bad | — |

Note:
*Good: No hole was made; Bad: A hole was made.
**Good: Not fractured; Bad: Fractured As is apparent from Tables 3 and 4, the shock-absorbing laminate according to the present invention is capable of reducing an impact force of 79000 N (produced by a 510 g steel ball dropped from a height of 1.5 m) to 50% or less, preferably 27% or less. Therefore, the shock-absorbing laminate, when stuck to a PDP glass substrate which is fractured by an impact force of 79000 N, makes the glass substrate shatterproof and resistant against fracture on impact.

Where the shock-absorbing laminate consists of a shatterproof layer, two or more fracture-proof layers, and a pressure-sensitive adhesive layer, it is essential that the shatterproof layer be the top layer and the pressure-sensitive adhesive layer be in contact with the glass substrate. As the sum of G ratios of these layers increases, the shock absorbing performance is enhanced, with the material and the thickness being equivalent.

According to the present invention, since the shock-absorbing laminate is directly formed on the glass substrate with no air gap, there is no fear of external light double reflection nor accumulation of dust or stain. Further, the shock-absorbing laminates of Examples 1 to 6 have a visible light transmission of 60% or more, preferably 70% or more, and a thickness of not greater than 1 mm. Therefore, the glass substrate with a shock-absorbing laminate of the invention is an excellent member of FPDs which does not impair the image quality to provide FPDs, especially PDPs.

EXAMPLE 7

A glass substrate with a shock-absorbing laminate shown in FIG. 6 was prepared as follows.

A 188 μm thick PET film having a shearing modulus of $1.4 \times 10^9$ Pa (A4100, available from Toyobo Co., Ltd.) one side of which had been treated to have improved adhesion was used as a shatterproof layer. A UV-curing acrylic urethane resin having a refractive index of 1.65 was diluted with methyl isobutyl ketone to a prescribed concentration and applied to the surface-treated side of the PET film with a wire bar, dried at 60° C., and irradiated with 400 mJ/cm² of UV radiation emitted from an ultra-high pressure mercury lamp to form a 5 μm-thick hard coat (HC) layer.

An alkoxysilane sol having a refractive index of 1.36 was applied to the HC layer with a wire bar and cured by heating at 120° C. for 10 minutes to form a 0.1 μm-thick low-refractive layer as an antireflective (AR) layer.

Silicon dioxide was deposited on the other side of the PET film to a deposit thickness of 95 nm by vacuum evaporation at room temperature. Then, a transparent multilayer laminate was formed on the $SiO_2$ layer by alternately forming a high-refractive dielectric film and a silver-containing transparent conductive film by DC magnetron sputtering using $In_2O_3$ (12.6 wt %) —$TiO_2$ as a target for forming the high-refractive dielectric films and Au (5 wt %) —Ag as a target for forming the silver-containing conductive films.

The resulting laminate (antireflective protective layer+ shatterproof layer) had a structure of AR/HC/PET/$SiO_2$ (95 nm)/IT (32.5 nm)/Ag (13 nm)/IT (65 nm)/Ag (13 nm)/IT (65 nm)/Ag (13 nm)/IT (32.5 nm). The thickness of each film was precisely measured with a contact type profilometer (DEKTAK3) in view of a film deposition rate calibration curve and a transmission electron microscope. The laminate had a surface resistivity of 1.6Ω and a transmission of 70%.

Separately, a butyl acrylate-acrylic acid copolymer having a weight average molecular weight of about 1,500,000 and a Tg of about −20° C. was applied on a release sheet to form an acrylic pressure-sensitive adhesive layer having a thickness of 25 μm and a shearing modulus of $7.7 \times 10^4$ Pa, which functioned as a fracture-proof layer 1. A PP/EVA/PP laminate having a thickness of 400 μm and a shearing modulus of $6.9 \times 10^7$ Pa (POVIC-T, available from Achilles Corp.)

was stuck thereto to form a fracture-proof layer 2. The same acrylic pressure-sensitive adhesive as used above was applied to the fracture-proof layer 2 to a thickness of 25 μm.

The release sheet was stripped off the resulting pressure-sensitive adhesive layer/POVIC/pressure-sensitive adhesive layer laminate, and the laminate was stuck to the IT film side of the above-prepared (antireflective protective layer+ shatterproof layer) laminate to prepare a shock-absorbing laminate (filter for PDP). The shock-absorbing laminate was stuck onto a sheet of high strain point glass (PD200; 300×300×2.8 (t) mm) with its transparent pressure-sensitive adhesive layer facing to the glass substrate to obtain a glass substrate with a transparent shock-absorbing laminate shown in FIG. 6 [AR/HC/PET (shatterproof layer)/$SiO_2$/(IT/ Ag)×3/IT/pressure-sensitive adhesive layer (fracture-proof layer 1)/POVIC-T (fracture-proof layer 2)/pressure-sensitive adhesive layer/PDP glass substrate]. "(IT/Ag)×3" means three (TT/AG) layers (hereinafter the same).

The resulting glass substrate with a shock-absorbing laminate was subjected to a glass fracture test with a single sheet or two sheets of the PD200 glass according to FIG. 5. The shock absorbing ratio R1 of the shock-absorbing laminate was measured according to FIG. 3. The transparent shock-absorbing laminate had a thickness of about 634 μm. This thickness caused no image distortion when the laminate was directly stuck to a PDP glass substrate. The glass substrate with a filter for PDP had a transmission of 63%.

EXAMPLE 8

A glass substrate with a transparent shock-absorbing laminate was prepared in the same manner as in Example 1, except that the following layers were formed on the shatterproof layer used in Example 7 in the order described: the same HC layer as formed in Example 7, an $SiO_2$ layer (thickness: λ/4n=95 nm), a metal film/transparent thin film laminate, an $SiO_2$ layer (thickness: λ/2n=190 nm) as a protective layer, and a stain-proof layer (thickness: 0.01 μm) which was prepared by coating with a perfluoroalkylsilane material (KP801M, available from Shin-Etsu Chemical Co., Ltd.).

The resulting glass substrate with a filter for PDP had the structure shown in FIG. 7 [stain-proof $SiO_2$/(IT/AG)×3/IT/ $SiO_2$/HC/PET (shatterproof layer)/pressure-sensitive adhesive layer (fracture-proof layer 1)/POVIC-T (fracture-proof layer 2)/pressure-sensitive adhesive layer/PDP glass substrate] and had a light transmission of 65%. The thickness of the shock-absorbing laminate (filter) was about 638 μm.

EXAMPLE 9

A glass substrate with a transparent shock-absorbing laminate was prepared in the same manner as in Example 8, except that the HC layer was omitted and that a commercially available antireflective PET film (ReaLook, available from NOF Corp.; thickness: about 105 μm) was adhered to the electromagnetic- and NIR-shielding layer via a pressure-sensitive adhesive layer (25 μm) formed of the same acrylic adhesive as used in Example 7 in place of the stain-proof $SiO_2$ protective layer.

The resulting glass substrate with a shock-absorbing laminate had the layer structure shown in FIG. 8 [antireflective PET/pressure-sensitive adhesive layer/(IT/ AG)×3/IT/$SiO_2$/PET (shatterproof layer)/pressure-sensitive adhesive layer (fracture-proof layer 1)/POVIC-T (fracture-proof layer 2)/pressure-sensitive adhesive layer/PDP glass substrate] and had a light transmission of 63%. The thickness of the shock-absorbing laminate was about 768 μm.

EXAMPLE 10

A glass substrate with a transparent shock-absorbing laminate was prepared in the same manner as in Example 7, except for using a 500 μm-thick polyurethane film (DUS605, non-yellowing type, available from Seadam Co.; shearing modulus: $4.6×10^7$ Pa) as the fracture-proof layer 2.

The resulting glass substrate with a shock-absorbing laminate had a structure [AR/HC/PET (shatterproof layer)/ $SiO_2$/(IT/AG)×3/IT/pressure-sensitive adhesive layer (fracture-proof layer 1)/DUS605 (fracture-proof layer 2)/pressure-sensitive adhesive layer/PDP glass substrate] and had a light transmission of 65%. The thickness of the shock-absorbing laminate was about 643 μm.

EXAMPLE 11

A glass substrate with a transparent shock-absorbing laminate was prepared in the same manner as in Example 7, except for using a 400 μm-thick ClearTec H film (a film of PP blended with a styrene-vinyl-isoprene elastomer, available from Kuraray Trading Co.; shearing modulus: $3.1×10^7$ Pa) as the fracture-proof layer 2.

The resulting glass substrate with a shock-absorbing laminate had a structure [AR/HC/PET (shatterproof layer)/ $SiO_2$/(IT/AG)×3/IT/pressure-sensitive adhesive layer (fracture-proof layer 1)/ClearTec H (fracture-proof layer 2)/pressure-sensitive adhesive layer/PDP glass substrate] and had a light transmission of 58%. The thickness of the shock-absorbing laminate was about 643 μm

EXAMPLE 12

A glass substrate with a transparent shock-absorbing laminate was prepared in the same manner as in Example 7, except for reversing the order of the fracture-proof layers 1 and 2 to make a structure: [Ar/BC/PET (shatterproof layer)/ $SiO_2$/(IT/Ag)×3/IT/POVIC-T (fracture-proof layer 1)/pressure-sensitive adhesive layer (fracture-proof layer 2)/pressure-sensitive adhesive layer/PDP glass] substrate].

Comparative Example 4

A glass substrate with a transparent shock-absorbing laminate was prepared in the same manner as in Example 7, except for replacing the POVIC layer with a 400 μm thick PET film (shearing modulus: $1.4×10^9$ Pa) as a fracture-proof layer 2, to make a structure: [Ar/HC/PET (shatterproof layer)/$Sio_2$/(IT/Ag)×3/IT/pressure-sensitive adhesive layer (fracture-proof layer 1)/PET (400 μm) (fracture-proof layer 2)/pressure-sensitive adhesive layer/PDP glass substrate] having. The shock-absorbing laminate had a thickness of 643 μm, and the glass substrate with a shock-absorbing laminate had a transmission of 63%.

Comparative Example 5

A glass substrate with a transparent shock-absorbing laminate was prepared in the same manner as in Example 7, except for removing the fracture-proof layers 1 and 2, to make a structure: [Ar/HC/PET (shatterproof layer)/$SiO_2$/ (IT/Ag)×3/IT/pressure-sensitive adhesive layer/PDP glass substrate]. The shock-absorbing laminate (from AR to pressure-sensitive adhesive layer) had a thickness of 218 μm, and the glass substrate with a shock-absorbing laminate (from AR to glass substrate) had a transmission of 65%.

Comparative Example 6

A glass substrate with a transparent shock-absorbing laminate was prepared in the same manner as in Example 10, except for removing the PET film as a shatterproof layer and the pressure-sensitive adhesive layer as a fracture-proof layer 1, to make a structure: [Ar/HC/SiO₂/(IT/Ag)×3/IT/DUS605 (fracture-proof layer 2)/pressure-sensitive adhesive layer/PDP glass substrate]. The shock-absorbing laminate (from AR to pressure-sensitive adhesive layer) had a thickness of 430 μm, and the glass substrate with a shock-absorbing laminate (from AR to glass substrate) had a transmission of 65%.

Comparative Example 7

A glass substrate with a transparent shock-absorbing laminate was prepared in the same manner as in Example 7, except that the AG/IT laminate [(IT/Ag)×3/IT] was replaced with a three-layer laminate having a structure: [IT (65 nm)/AG (13 nm)/IT (65 nm)]. The resulting shock-absorbing laminate had a thickness of 643 μm. The glass substrate with a shock-absorbing laminate had a transmission of 66%. The electromagnetic- and NIR-shielding layer has a surface resistivity of 5.5 Ω.

EXAMPLE 13

A glass substrate with a transparent shock-absorbing laminate, having the layer structure shown in FIG. 9 was prepared in the same manner as in Example 9 with the following exceptions. The layers [antireflective PET/pressure-sensitive adhesive layer/(IT/AG)×3/IT/SiO₂] formed on the front side of the shatterproof PET film in Example 9 were not formed and, instead, only the conductive multilayer laminate [(IT/AG)×3/IT] was formed on the rear side of the PET shatterproof layer as an electromagnetic and NIR shielding layer. A conductive mesh pattern 12 (see FIG. 9) made of Cu and Cr having a wire width of 30 μm and a wire pitch of 200 μm was formed on the front side of the shatterproof PET film. The mesh pattern had an open area ratio of about 74%. The same acrylic pressure-sensitive adhesive used in Example 9 was applied thereon to fill the openings of the mesh and to form a pressure-sensitive adhesive layer 11 (see FIG. 9). Then, the same antireflective (AR) PET film as used in Example 9 was stuck on the pressure-sensitive adhesive layer 11.

There was thus prepared a glass substrate with a transparent shock-absorbing laminate: [AR PET/pressure-sensitive adhesive layer/Cu-Cr mesh/PET (shatterproof layer)/(IT/Ag)×3+IT/pressure-sensitive adhesive layer (fracture-proof layer 1)/POVIC-T (fracture-proof layer 2)/pressure-sensitive adhesive layer/PDP glass substrate] which had a transmission of about 50% and a reflectance of about 2%. In FIG. 9, numeral 10 indicates an electrode formed of silver paste (hereinafter described in detail).

In the layer structure of Example 13, the function as an electromagnetic shielding layer was performed by the Cu—Cr mesh pattern and the conductive multiple laminate [(IT/Ag)×3/IT], and the function as an NIR shielding layer was performed by the conductive multiple laminate.

In Examples 7 to 13, an electrode must be formed either on the front side or the rear side of the electromagnetic shielding layer (i.e., the transparent conductive multiple laminate or the metal mesh pattern) for grounding. For this purpose, silver paste (Dotite FA-301 CA, available from Fujikura Kasei Co., Ltd.) was applied by screen printing on the four sides of the electromagnetic shielding layer over a width of about 10 mm from edges to a thickness of about 20 μm. Where a protective layer was provided on the shielding layer, the protective layer was formed within the area surrounded by the electrode frame. Where the shielding layer is provided below the shatterproof PET layer, the fracture-proof layers 1 and 2 and the pressure-sensitive adhesive layer were formed within the area surrounded by the frame of the electrode.

The results of Examples 7 to 12 and Comparative Examples 4 to 7 are shown in Tables 5 and 6 below.

TABLE 5

| | R0 (%) | | | Shearing Modulus (G) (Pa) | | | | | |
|---|---|---|---|---|---|---|---|---|---|
| | One Glass Sheet | Two Glass Sheets | Refractive Layer AR PET | Pressure-sensitive Adhesive Layer | Scatter-proof Layer | Fracture-proof Layer 1 | Fracture-proof Layer 2 | Pressure-sensitive Adhesive Layer | Sum of G Ratio |
| Example 7 | 46.0 | 27.0 | — | — | $1.4 \times 10^9$ | $7.7 \times 10^4$ | $6.9 \times 10^7$ | $7.7 \times 10^4$ | 10.2 |
| Example 8 | 46.0 | 27.0 | — | — | $1.4 \times 10^9$ | $7.7 \times 10^4$ | $6.9 \times 10^7$ | $7.7 \times 10^4$ | 10.2 |
| Example 9 | 46.0 | 27.0 | $1.4 \times 10^9$ | $7.7 \times 10^4$ | $1.4 \times 10^9$ | $7.7 \times 10^4$ | $6.9 \times 10^7$ | $7.7 \times 10^4$ | 18.7 |
| Example 10 | 46.0 | 27.0 | — | — | $1.4 \times 10^9$ | $7.7 \times 10^4$ | $4.6 \times 10^7$ | $7.7 \times 10^4$ | 9.8 |
| Example 11 | 46.0 | 27.0 | — | — | $1.4 \times 10^9$ | $7.7 \times 10^4$ | $3.1 \times 10^7$ | $7.7 \times 10^4$ | 9.5 |
| Example 12 | 46.0 | 27.0 | — | — | $1.4 \times 10^9$ | $6.9 \times 10^7$ | $7.7 \times 10^7$ | $7.7 \times 10^4$ | 4.3 |
| Example 13 | 46.0 | 27.0 | $1.4 \times 10^9$ | $7.7 \times 10^4$ | $1.4 \times 10^9$ | $7.7 \times 10^4$ | $6.9 \times 10^7$ | $7.7 \times 10^4$ | 18.7 |
| Comparative Example 4 | 46.0 | 27.0 | — | — | $1.4 \times 10^9$ | $7.7 \times 10^4$ | $1.4 \times 10^9$ | $7.7 \times 10^4$ | — |
| Comparative Example 5 | 46.0 | 27.0 | — | — | $1.4 \times 10^9$ | — | — | $7.7 \times 10^4$ | — |
| Comparative Example 6 | 46.0 | 27.0 | — | — | — | — | $4.6 \times 10^7$ | $7.7 \times 10^4$ | — |
| Comparative Example 7 | 46.0 | 27.0 | — | — | $1.4 \times 10^9$ | $7.7 \times 10^4$ | $6.9 \times 10^7$ | $7.7 \times 10^4$ | — |

TABLE 6

| | R1 (%) | Shatter-proofness* | State of Glass in Fracture Test** | |
|---|---|---|---|---|
| | | | One Sheet | Two Sheet |
| Example 7 | 24.0 | Good | Good | Good |
| Example 8 | 24.0 | Good | Good | Good |
| Example 9 | 20.0 | Good | Good | Good |
| Example 10 | 26.0 | Good | Good | Good |
| Example 11 | 21.0 | Good | Good | Good |

TABLE 6-continued

|  |  |  |  |  |
|---|---|---|---|---|
| Example 12 | 37.0 | Good | Good | Bad |
| Example 13 | 20.0 | Good | Good | Good |
| Comparative Example 4 | 53.0 | Good | Bad | Bad |
| Comparative Example 5 | 62.0 | Good | Bad | Bad |
| Comparative Example 6 | 68.0 | Bad | Bad | Bad |
| Comparative Example 7 | 24.0 | Good | Good | Good |

| | Optical Characteristics | | |
|---|---|---|---|
| | Visible light Transmission (%) | Visible Light Reflectance (%) | NIR Transmission (%) |
| Example 7 | 63.0 | 2.0 | <10 |
| Example 8 | 65.0 | 1.5 | <10 |
| Example 9 | 63.0 | 3.0 | <10 |
| Example 10 | 63.0 | 2.0 | <10 |
| Example 11 | 58.0 | 2.0 | <10 |
| Example 12 | 63.0 | 2.0 | <10 |
| Example 13 | 50.0 | 3.0 | <10 |
| Comparative Example 4 | 64.0 | 2.0 | <10 |
| Comparative Example 5 | 67.0 | 2.0 | <10 |
| Comparative Example 6 | 65.0 | 2.0 | <10 |
| Comparative Example 7 | 66.0 | 2.0 | 55% at 800 nm 48% at 850 nm |

As is apparent from the above results, the shock-absorbing laminate of the invention exhibits excellent optical characteristics, i.e., high visible light transmission and high NIR shielding properties, as well as excellent shock absorbing performance. Since the shock-absorbing laminate is directly adhered to a glass substrate, there is no fear of external light double reflection nor accumulation of dust or stain. Further, the shock-absorbing laminate having a multiple structure alternately composed of silver-containing films and high-refractive thin films as an electromagnetic and NIR shielding layer shows an electromagnetic shielding effect of 10 dB or more and reduces an NIR (800 to 1200 nm) transmission to 20% or less. Therefore, the shock-absorbing laminate of the invention is excellent as a filter for PDPs.

While the invention has been described in detail and with reference to specific examples thereof, it will be apparent to one skilled in the art that various changes and modifications can be made therein without departing from the spirit and scope thereof.

What is claimed is:

1. A transparent shock-absorbing laminate to be formed on a glass substrate for a display panel having a fracture strength such that it is fractured by a falling ball impact, from a drop height of 1.5 m and a ball weight of 510 g, corresponding to 79,000 N, said transparent shock-absorbing laminate comprising a shatterproof layer having a shearing modulus of $2 \times 10^8$ Pa or more, at least two fracture-proof layers having a shearing modulus ranging from $1 \times 10^4$ to $2 \times 10^8$ Pa, each having different modulus, and a transparent pressure-sensitive adhesive layer.

2. The transparent shock-absorbing laminate as claimed in claim 1, which further comprises at least one of a transparent electromagnetic shielding layer and a near infrared shielding layer having a transmission of 20% or less in a wavelength region of from 800 to 1200 nm.

3. The transparent shock-absorbing laminate as claimed in claim 1 or 2, wherein said shock-absorbing laminate has a thickness of 2 mm or smaller and a visible light transmission of 40% or higher.

4. The transparent shock-absorbing laminate as claimed in claim 1, which absorbs 50% or more of a falling ball impact corresponding to an impact force of 79,000 N.

5. The transparent shock-absorbing laminate as claimed in claim 1, wherein said laminate has at least two fracture-proof layers, said laminate has a layer order of shatterproof layer (1)/fracture-proof layer (2)/fracture-proof layer (3)/ . . . fracture-proof layer (n)/pressure-sensitive adhesive layer (n+1), and the shearing moduli of the layers (2) to (n) are such that the absolute logarithmic values of shearing modulus (G) ratios of upper to lower layers adjacent to each other via every interface among the layers (1) to (n+1) are added up to give the greatest sum, said sum of shearing modulus ratios being represented by:

$$|\text{Log } G1/G2| + |\text{Log } G2/G3| + \ldots + |\text{Log } Gn-1/Gn| + |\text{Log } Gn/Gn+1|.$$

6. The transparent shock-absorbing lainate as claimed in claim 1, which comprises said transparent adhesive layer, said at least two fracture-proof layers, said shatterproof layer, and an antireflective layer in this order and further comprises at least one of an electromagnetic shielding layer and a near infrared shielding layer.

7. The transparent shock-absorbing laminate as claimed in claim 1, which is a filter for a plasma display.

8. A plasma display panel comprising the transparent shock-absorbing laminate as claimed in claim 1, formed on a glass substrate of a plasma display panel via a transparent pressure-sensitive adhesive.

9. A flat panel display comprising the transparent shock-absorbing laminate as claimed in claim 1, formed on a glass substrate thereof via a pressure-sensitive adhesive.

* * * * *